US011373406B2

(12) United States Patent
Smith et al.

(10) Patent No.: US 11,373,406 B2
(45) Date of Patent: Jun. 28, 2022

(54) TRANSMISSION, CACHING, AND SEARCHING OF VIDEO STREAMS BASED ON FRAME DEPENDENCIES AND CONTENT

(71) Applicant: Intel Corporation, Santa Clara, CA (US)

(72) Inventors: Ned M. Smith, Beaverton, OR (US); Yi Zou, Portland, OR (US); Shao-Wen Yang, San Jose, CA (US); Gang Shen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 33 days.

(21) Appl. No.: 16/457,818

(22) Filed: Jun. 28, 2019

(65) Prior Publication Data

US 2019/0325227 A1   Oct. 24, 2019

(51) Int. Cl.
*G06K 9/00* (2022.01)
*G06V 20/40* (2022.01)
*G06F 16/738* (2019.01)

(52) U.S. Cl.
CPC ............ *G06V 20/46* (2022.01); *G06F 16/738* (2019.01); *G06V 20/48* (2022.01)

(58) Field of Classification Search
CPC ............ G06K 9/00744; G06K 9/00758; G06F 16/738
USPC ....................................................... 382/190
See application file for complete search history.

(56) References Cited

U.S. PATENT DOCUMENTS

| | | | | |
|---|---|---|---|---|
| 2010/0202508 A1* | 8/2010 | Karaoguz | .............. | H04N 19/61 375/240.01 |
| 2010/0278230 A1* | 11/2010 | MacInnis | ............. | H04N 19/172 375/240.02 |
| 2010/0302985 A1* | 12/2010 | Poola | ...................... | H04L 1/189 370/312 |
| 2012/0180101 A1* | 7/2012 | Davis | ................. | H04N 21/2402 725/116 |
| 2014/0071232 A1* | 3/2014 | Tsukagoshi | .......... | H04N 13/178 348/43 |
| 2015/0244980 A1* | 8/2015 | Matthews | ................. | G06T 9/00 348/14.08 |
| 2016/0057489 A1* | 2/2016 | He | ...................... | H04N 21/8456 725/14 |

(Continued)

*Primary Examiner* — Stephen P Coleman
(74) *Attorney, Agent, or Firm* — Alliance IP, LLC

(57) ABSTRACT

In one embodiment, an apparatus comprises processing circuitry to: receive, via a network interface, a video stream comprising a plurality of video frames; identify a plurality of dependencies among the plurality of video frames; identify, based on the plurality of dependencies, a first subset of video frames to be transmitted using a first transmission method and a second subset of video frames to be transmitted using a second transmission method, wherein the first subset of video frames and the second subset of video frames are identified from the plurality of video frames, and wherein the first transmission method provides a higher quality of service than the second transmission method; transmit, via the network interface, the first subset of video frames to a corresponding destination using the first transmission method; and transmit, via the network interface, the second subset of video frames to the corresponding destination using the second transmission method.

25 Claims, 12 Drawing Sheets

(56) References Cited

U.S. PATENT DOCUMENTS

2018/0253567 A1* 9/2018 Gonzalez-Banos .......................... H04N 1/32144
2018/0261020 A1* 9/2018 Petousis ............... G07C 5/0841
2020/0092086 A1* 3/2020 Raman ................ G06F 16/1805

* cited by examiner

TRANSMISSION, CACHING, AND SEARCHING OF VIDEO STREAMS BASED ON FRAME DEPENDENCIES AND CONTENT

FIELD OF THE SPECIFICATION

This disclosure relates in general to the field of visual computing, and more particularly, though not exclusively, to transmission, caching, and searching of video streams based on frame dependencies and content.

BACKGROUND

A video stream typically contains a sequence of compressed video frames. Due to the compression and/or encoding scheme, there are often many dependencies among frames in the video stream. For example, some frames in the video stream may be independently compressed and encoded, while the majority of the frames may be compressed and encoded with reference to other similar frames. Accordingly, when a frame used to compress or encode other frames is dropped during transmission, video rendering and/or video analytics tasks can suffer drastically, as the loss of the frame hinders the ability to decode numerous other dependent frames.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
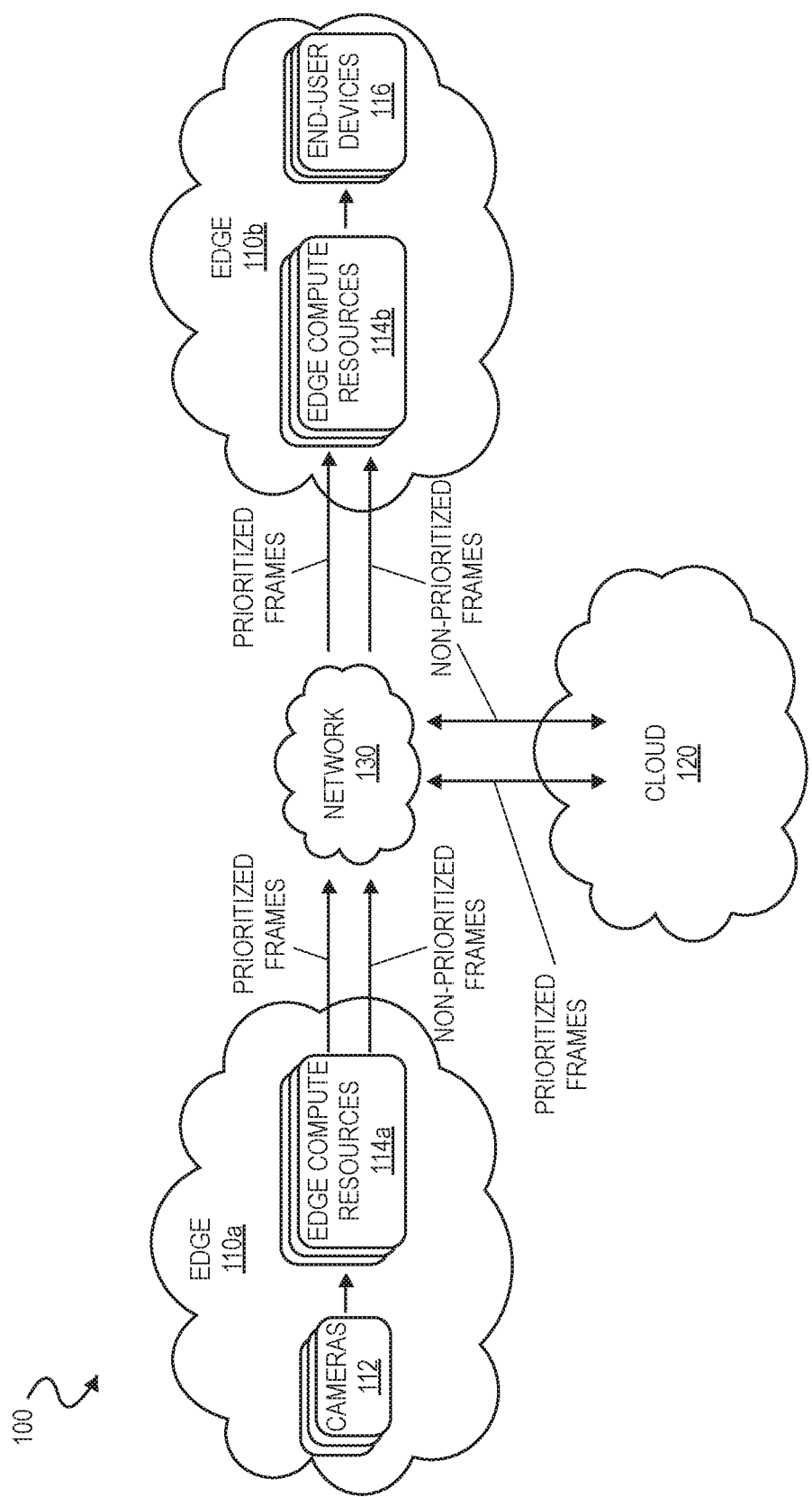
FIG. 1 illustrates an example video streaming system in accordance with certain embodiments.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

FIG. 1 illustrates an example video streaming system 100 in accordance with certain embodiments. In the illustrated embodiment, video content can be streamed (i) from cameras 112 to end users 116, (ii) from cameras 112 to the cloud 120 (e.g., to perform analytics), and/or (iii) from the cloud 120 to end users 116 (e.g., for online video streaming services). Moreover, different transmission mechanisms are used to transmit different frames of a video stream depending on the importance of the frame from a quality of service (QoS) perspective. In particular, frames that are more important to the overall QoS of a video stream may be transmitted using more reliable transmission mechanisms than other frames, as described further below.

In the illustrated embodiment, video streaming system 100 is a distributed fog computing system capable of capturing, streaming, and/or analyzing video using resources distributed throughout the edge-to-cloud pipeline (which may also be referred to as the "fog"). In some cases, for example, video captured by cameras 112 deployed at the network edge 110a may be streamed over a network 130 using edge computing resources 114a. For example, the video may be streamed from the cameras 112 to end-user devices 116 on another part of the network edge 110b (e.g., via edge computing resources 114b) for display to end users, or the video may be streamed to the cloud 120 to perform video analytics. Alternatively, video content in the cloud 120 may be streamed to the end-user devices 116 for display, such as video content associated with online video streaming services. In various embodiments, however, the functionality of video streaming system 100 can be distributed across any combination of devices and components deployed throughout an end-to-end (E2E) network topology, including at the edge, in the cloud, and/or anywhere in between in the "fog." For example, the described video streaming functionality can be performed by any combination of cameras 112, edge computing resources 114a-b, fog computing resources, cloud computing resources 120, and/or end-user devices 116.

Video streaming protocols typically stream video content as a sequence of video frames that are separately compressed and encoded (e.g., using the H.264 video compression standard). Each frame is typically compressed and encoded either as an intra-coded frame or an inter-coded frame. For example, an intra-coded frame, or key frame, is compressed and encoded in its entirety independently from other frames, while an inter-coded frame, or non-key frame, is compressed and encoded only with the differences relative to another similar frame (e.g., another key frame or non-key frame). In this manner, key frames are typically encoded sporadically throughout a video stream whenever there is a significant change in the video content (e.g., a scene transition), while the remaining frames in the video stream are typically encoded as non-key frames.

When video frames are streamed sequentially, however, video rendering and/or video analytics tasks typically become more glitchy when key frames are dropped versus when non-key frames are dropped, as non-key frames depend on key frames for proper decoding. For example, dropping a key frame renders its corresponding non-key frames useless, as the non-key frames cannot be decoded without the corresponding key frame. Due to these frame dependencies, a noisy transmission channel can have amplified effects on user experience when decoding a video stream in connection with video rendering and/or video analytics tasks, as the loss of a single key frame can hinder the ability to decode numerous other dependent non-key frames.

In some cases, a video stream may be communicated over a channel that has higher transmission quality, such as using the resource reservation protocol (RSVP) or another similar quality of service (QoS) streaming protocol. For example, QoS streaming protocols can be used to deliver both key frames and non-key frames more reliably, thus increasing the likelihood that non-key frames—which depend on key frames—can be properly decoded (e.g., assuming the requisite key frame arrives before the corresponding non-key frames). However, these QoS solutions apply the same level of control to all frames regardless of the frame dependency semantics, which results in higher transmission costs. There are no existing solutions that differentiate the QoS level for video streams on a per-frame basis.

Additionally, or alternatively, when a video stream does not need to be delivered in real time, multiple redundant copies of the underlying video frames may be transmitted, which increases the likelihood of key frames arriving before their corresponding non-key frames. This approach consumes additional bandwidth, however, which results in higher transmission costs. Moreover, this approach still requires all frames to be delivered in a sequential flow—if video frames arrive out of order and/or key frames are dropped, certain non-key frames may be prevented from being properly decoded.

Accordingly, in video streaming system 100 of FIG. 1, video frames with higher coupling semantics are treated differently from those with low coupling semantics, which allows alternative methods of reliable communication (e.g., QoS streaming protocols) to be applied more cost effectively on a per-frame basis. For example, the degree of coupling for a given video frame refers to the number of other frames in the video stream that have dependencies based on that frame. Moreover, as explained above, frames with a high degree of coupling (e.g., key frames) have greater significance with respect to user experience when processing and rendering frames, as the loss of a frame with a high coupling dependency could result in multiple dropped frames, which may lead to more noticeable glitches. Thus, in video streaming system 100, the dependencies among frames are evaluated in order to identify frames that are crucial to the overall quality of service (QoS) of a video stream, and those frames are then prioritized and delivered using more reliable mechanisms than other frames in the video stream.

In various embodiments, for example, the more reliable delivery mechanisms used for frames identified as "high priority" may include (1) transmitting the high priority frames using QoS streaming protocols that provide higher reliability (e.g., using the resource reservation protocol (RSVP)), (2) transmitting multiple replicated or redundant copies of the high priority frames, and/or (3) caching the high priority frames at edge resources 114*b* deployed near the consuming end users 116 to facilitate fast and reliable delivery.

In this manner, high-reliability delivery mechanisms are selectively employed on a per-frame basis to improve the overall quality of service (QoS) for a video stream in a cost-effective manner. For example, these high-reliability delivery mechanisms are only employed on high priority frames to minimize the associated transmission costs, while increasing the success rate for delivery of the high priority frames and thus minimizing the loss of dependent frames that occurs when these high priority frames are dropped.

In some embodiments, for example, the high priority frames may be identified by evaluating the frame dependencies among the frames of the video stream, which can include dependencies that result from the compression and encoding scheme applied to the video frames, along with dependencies that result from any confidentiality and integrity protections applied to the video frames (e.g., encryption, masking), among other types of dependencies.

For example, with respect to the compression and encoding scheme applied to the video stream, frames encoded as key frames are compressed independently of other frames, while frames encoded as non-key frames are compressed with reference to other key frames and/or non-key frames. Thus, for a given frame in the video stream (e.g., a key frame or non-key frame), there may be one or more other frames in the video stream that are dependently compressed and encoded from that frame.

Moreover, in some cases, confidentiality and/or integrity protections may be applied to the video stream based on a security policy. For example, frames containing sensitive or confidential content (e.g., sensitive objects) may be encrypted or otherwise protected with integrity and/or authenticity verifications (e.g., using message authentication codes (MAC)) for added security. However, this creates an additional inter-frame dependency where ciphertext blocks may depend on previous blocks that may bridge frames. For example, encrypted frames may employ enciphering methods that cause cipher blocks to be dependent on previous cipher blocks. If dependent cipher blocks bridge video frames (whether they are key frames or non-key frames), then the current frame becomes dependent on the previous frame.

The degree of coupling for a given frame may refer to the number of other frames that have dependencies based on that frame, including compression and encoding dependencies, confidentiality and/or integrity dependencies, and so forth. Moreover, frames with a high degree of coupling may be identified as the high priority frames that are transmitted using more reliable delivery mechanisms.

In some embodiments, for example, this solution uses multiple layers of video stream classifiers to recognize and classify content (e.g., objects) found in each frame, apply integrity and confidentiality protections per frame (or among frames) based on the recognized content, and determine inter-frame dependencies among the frames (e.g., compression and encoding dependencies, confidentiality and integrity dependencies, and so forth).

The use of a video content classifier enables the frames to be selectively encrypted and/or integrity protected based on their underlying content in view of a corresponding security policy. For example, a security policy may identify certain types of sensitive objects or content that should be subject to encryption and/or integrity protections, and those protections may be applied based on the content recognized by the video classifier.

A frame dependency classifier may then be used to recognize dependencies among the frames, such as dependencies that result from application of the compression and encoding scheme and/or the security protections.

The frames are then prioritized for delivery using transmission mechanisms with varying levels of reliability based on the frame dependencies identified by the frame dependency classifier. In some embodiments, for example, a streaming orchestrator may apply the most appropriate streaming and/or caching option to each frame based on the identified frame dependencies.

For example, in some embodiments, frames with the highest degree of dependency coupling may be selected as "replica" frames, which, as the name implies, are candidates for being replicated during transmission to allow them to be conveniently re-inserted into the video stream if they are dropped, thus avoiding re-transmission overhead. In some cases, replica frames may be communicated over a second streaming channel that has a higher quality of service (QoS) rating, and the replica frames may be multiplexed with the non-replica frames before decoding occurs.

Moreover, in cases where streaming need not occur in real time, replica frames may be pre-cast to decentralized repositories that are close to the consuming nodes. For example, multiple edge base stations may receive replica copies of the replica frames to support mobile stream consumers. Alternatively, or additionally, replica frames may be pushed closer to consuming nodes through distributed hash tables (DHTs) and/or blockchain networks. For example, a distributed hash table (DHT) may be used to pre-cast video libraries containing replica frames closer to the consuming devices. As another example, a blockchain network may be used to protect and synchronize replica frames across multiple blockchain nodes, resulting in multiple copies of replica frames being "cached" across the blockchain network.

In this manner, the described solution can be used to improve the overall quality of service (QoS) of video streams in a cost-efficient manner using efficient transmission and caching mechanisms. Further, the described solution can also be used to efficiently catalog and search video streams on a frame-by-frame granularity (e.g., based on metadata generated by the video content classifier). This solution is applicable to a wide variety of use cases, such as smart city camera mesh systems linking thousands of points of video streams (e.g., to detect anomalies that may have a safety, security, or health impact), in-store and in-home observation systems aimed at improving user experiences in controlled spaces, digital security and surveillance systems, online video streaming services, and so forth.

Figure 2:
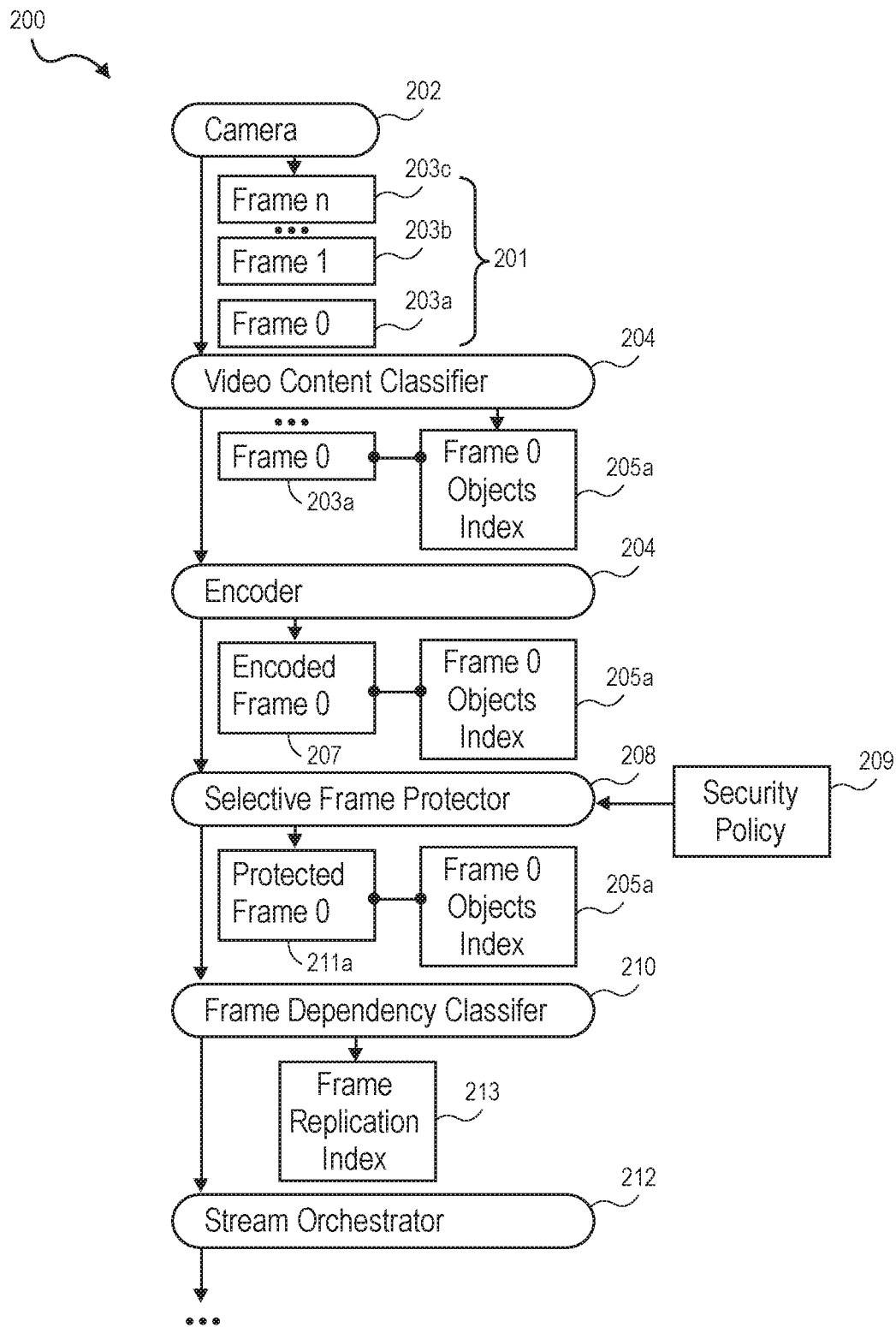
FIG. 2 illustrates an example implementation of video streaming using varying per-frame quality of service (QoS).

FIG. 2 illustrates an example implementation 200 of video streaming using varying per-frame quality of service (QoS). In some embodiments, for example, the video streaming functionality 200 of FIG. 2 may be implemented by the components of video streaming system 100 of FIG. 1.

In the illustrated example, a video stream 201 containing a sequence of video frames 203a-c (e.g., frames 0, 1, ..., n) is captured by a camera 202. In other embodiments, however, the video stream 201 may be provided by other sources, such as online video streaming services and/or video content providers.

The frames 203a-c of the video stream 201 are then fed into a video content classifier 204 to interpret the underlying video content. In some embodiments, for example, the video content classifier 204 may be a frame-oriented content classifier that relies on machine learning (ML) and/or artificial intelligence (AI) techniques to identify objects and/or other content visible in each frame 203a-c. In some cases, for example, the video content classifier 204 may be trained to recognize inanimate objects (e.g., ball, car, house), animate objects (e.g., cat, person, grandma), and/or actions (e.g., running, jumping, sitting). Moreover, sequences of frames 203a-c may be processed by the classifier 204 in order to classify objects with high reliability. In that case, the classifier 204 may label multiple frames 203a-c with the objects occurring in each of the frames. An index of recognized objects 205 may be associated with each frame (e.g., frame 0 objects index, frame 1 objects index, ... frame n objects index), for example, using a metadata structure that may be included in a stream encoding format (e.g., MPEG) or may be externally located in a database and indexed to the frame identifiers containing each object.

The frames 203a-c of the video stream 201 are then fed into an encoder 206 to perform compression and/or encoding. For example, the encoder 206 may apply a compression and/or encoding scheme (e.g., H.264) to each frame 203a-c to generate corresponding encoded frames 207 (e.g., encoded frame 0, encoded frame 1, ..., encoded frame n).

The encoded frames 207 are then fed into a selective frame protector 208, which selectively applies security (e.g., encryption), confidentiality (e.g., privacy), and/or integrity protections to certain frames based on their underlying content and a security policy 209. As a result, the selective frame protector 208 may output corresponding protected frames 211a-c with the appropriate protections applied (e.g., protected frame 0, protected frame 1, ..., protected frame n). For example, the security policy 209 may specify how to protect a particular frame in view of the objects and/or content in the frame (e.g., as identified by the video content classifier 204). In some cases, for example, the protection may be in the form of encryption, message authentication code (MAC) computation, re-touching the frame (e.g., to remove or obfuscate objects), or dropping the frame (e.g., although ideally, frames are not dropped unless the other available forms of protection are inadequate under the circumstances). Further, in some cases, the protection mechanisms may be specific to the entity or community that will ultimately consume the video content. For example, different protections may be applied for different consumers or recipients of the video stream (e.g., different end users, viewers, analytics applications, and so forth). Thus, if the security policy 209 differentiates the level of protection based on a diversity of content consumers, there may be multiple streams of frames that may be managed as independent streams.

The frames (e.g., raw 203, encoded 207, and/or protected frames 211) are then fed into a frame dependency classifier 210 to identify the various dependencies among the frames, such as compression and encoding dependencies, confidentiality and integrity dependencies, and so forth. For example, the frame dependency classifier 210 considers the stream encoding and rendering techniques to recognize when the decode logic for a particular frame is keyed from the decode logic for a previous frame. Traditionally, the dependent frame may be referred to as a non-keyed frame and the previous frame may be referred to as a keyed frame. The frame dependency classifier 210 may also identify additional dependencies that pertain to the type of protection applied by the selective frame protector 208. For example, a sequence of key frames may contain a common object that is encrypted, where the encipherment algorithm causes the first frame to depend on the second frame and so forth to ensure that all the frames are linked (e.g., thus preventing the removal of a frame and/or the insertion of a foreign frame). This cryptographic dependency may also be recognized by the frame dependency classifier 210.

Based on the identified dependencies among the frames, the frame dependency classifier 210 outputs a frame replication index 213. For example, the frame dependency classifier 210 constructs an index 213 of the various frames and their dependency graphs so that the relative importance of a frame can be recognized in terms of the depth and breadth of its dependency graph (e.g., which may be represented as a tree of dependencies among frames). Frames determined to be of high relevance (e.g., based on the corresponding dependencies) may be identified as "replica frames," which may ultimately be delivered using more reliable transmission mechanisms. In practice, however, the determination of which frames to designate as "replica frames" may be based on frame dependencies in conjunction with a policy that balances the available storage, network bandwidth, and cost targets. Moreover, in some embodiments, the frames may be partitioned into different levels or tiers, such that the frames are transmitted using varying levels of reliability based on on their corresponding level or tier.

Figure 3:
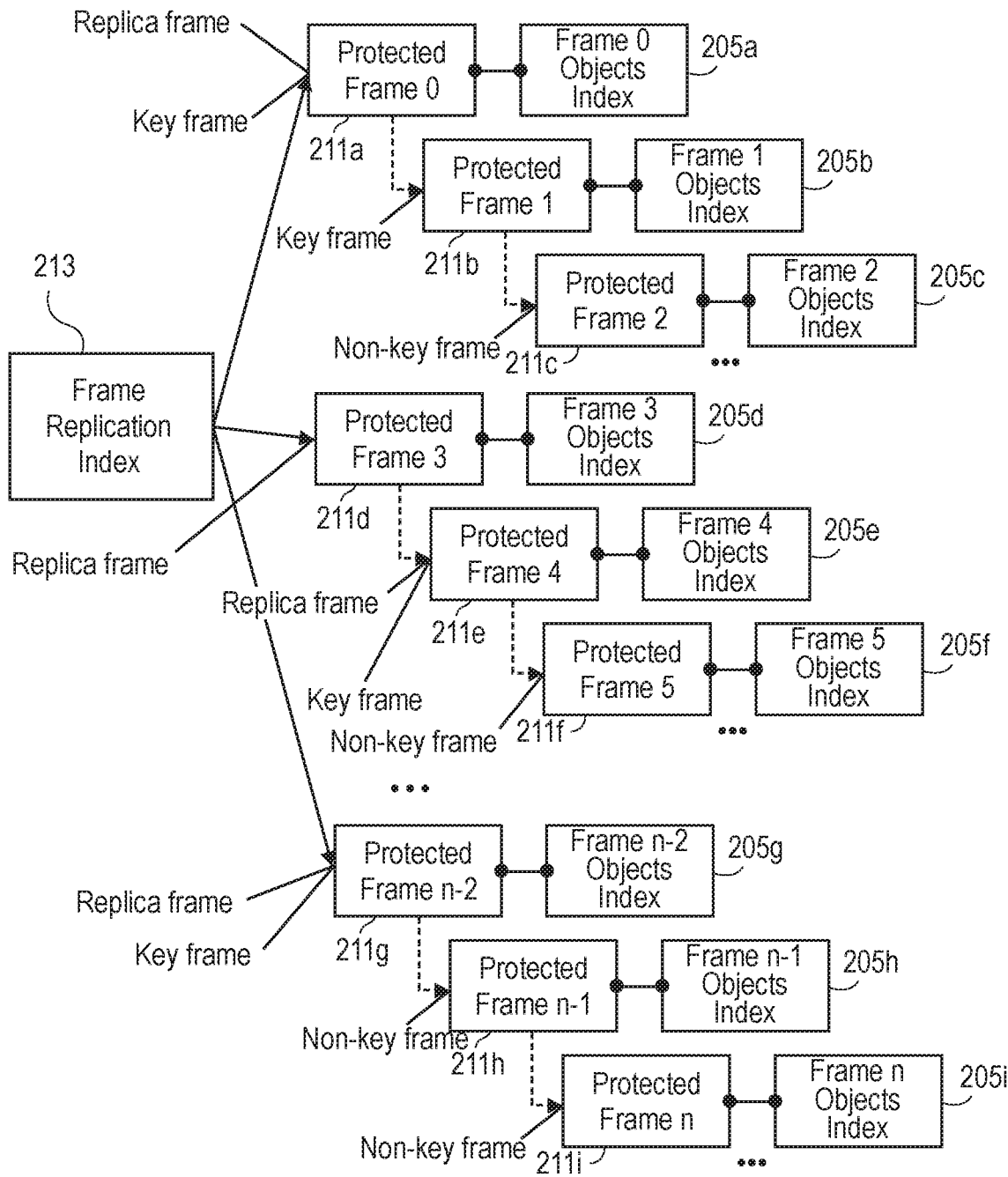
FIG. 3 illustrates an example of a frame replication index for streaming video using varying per-frame quality of service (QoS).

A more detailed representation of the frame replication index 213 of FIG. 2 is presented in FIG. 3. As shown in FIG. 3, the frame replication index 213 contains dependency graphs depicting the dependencies among different sets of frames 211a-i in the video stream, along with the corresponding objects index 205a-i for each frame. Moreover, the frame replication index 213 also designates each frame 211a-i as a replica frame, key frame, and/or non-key frame.

Turning back to FIG. 2, a video stream orchestrator 212 uses the frame replication index 213 to orchestrate the transmission of each frame of the video stream using appropriate transmission mechanism(s). For example, based on the designation of replica frames and/or the frame dependencies identified in the frame replication index 213, the orchestrator 212 considers how best to transmit, cache, and otherwise distribute the frames in view of the expected consumers of the stream. In particular, the orchestrator 212 may utilize a variety of transmission mechanisms or resources for each frame based on its designation (e.g., replica frame or non-replica frame, key frame or non-key frame) and/or based on the dependencies in the frame replication index 213.

For example, the orchestrator 212 may select replica frames for delivery using a channel that has higher quality of service (QoS) guarantees. This ensures that the replica frames are delivered and available before their corresponding dependent frames are received and ready for decoding (while still allowing lower cost channel(s) to be used for non-replica frames). The orchestrator 212 may additionally or alternatively utilize a system of distributed hash table (DHT) repositories that identifies replica frames for replication across multiple DHT nodes. The orchestrator 212 may additionally or alternatively use blockchain networks to commit replica frames to a blockchain where blockchain synchronization mechanisms will replicate the frames across multiple instances of the blockchain blocks. In some embodiments, the number of replica can be configurable and vary based on a per-frame policy as well as actually scale for replication such that more or less replica nodes can be assigned to the frames of interest.

In some embodiments, this solution may expect the sequence of frames to be reconstructed according to an expected stream encoding scheme (e.g., H.264), where traditional stream rendering hardware and software can be applied at the consuming endpoint. Accordingly, the frame replication index 213 maintains the original serialization sequence as part of the dependency graph, which can be used to reconstruct the stream. For example, a graph traversal algorithm can be applied to the dependency graph in the frame replication index 213 to reproduce the original frame sequence of the video stream.

It should be appreciated that various embodiments may perform the stages described in connection with FIG. 2 in a different order and/or may omit certain stages.

Figure 4A:
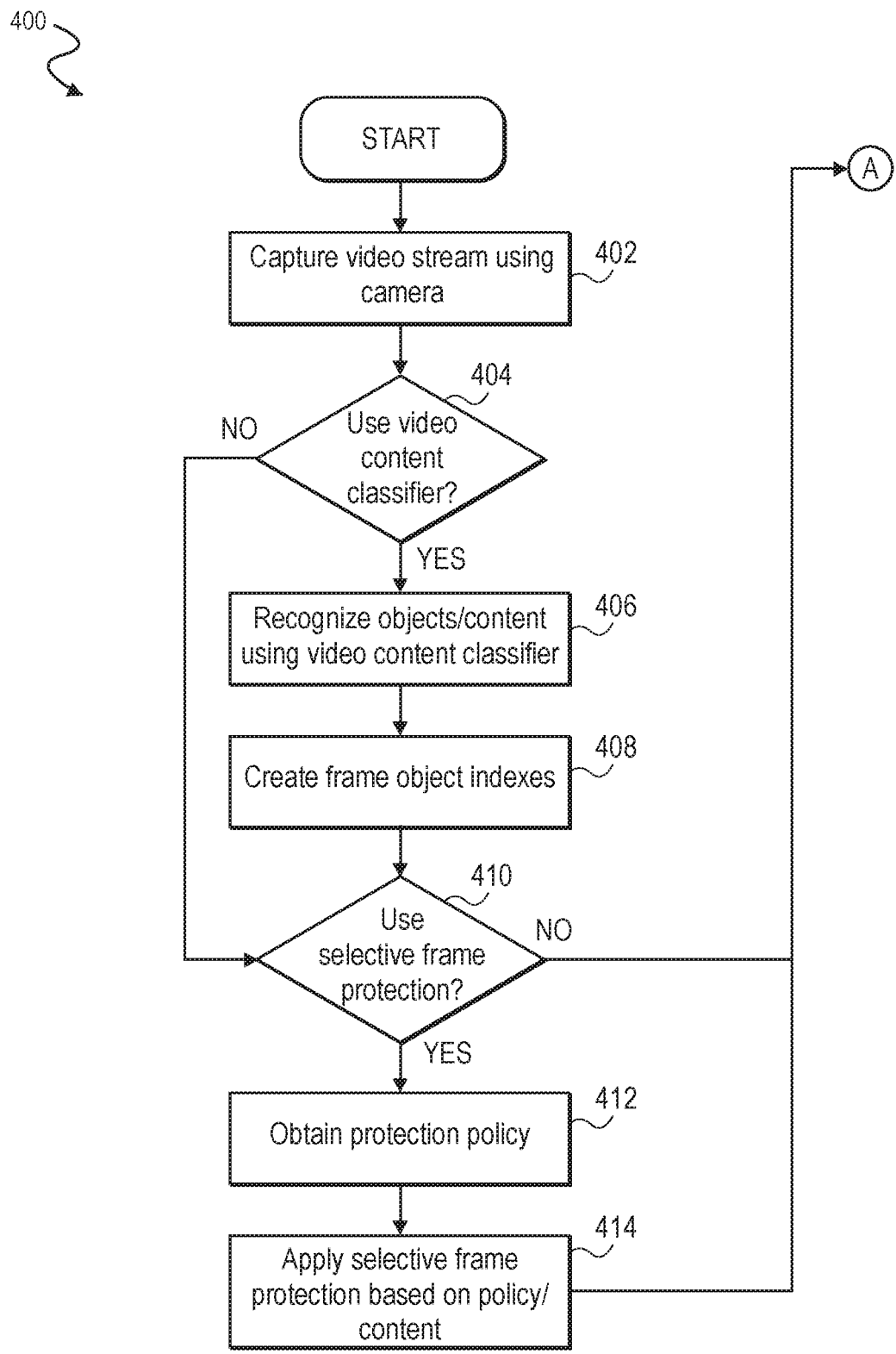
FIGS. 4A-C illustrate a flowchart for an example embodiment of video streaming using varying per-frame quality of service (QoS).
Figure 4B:
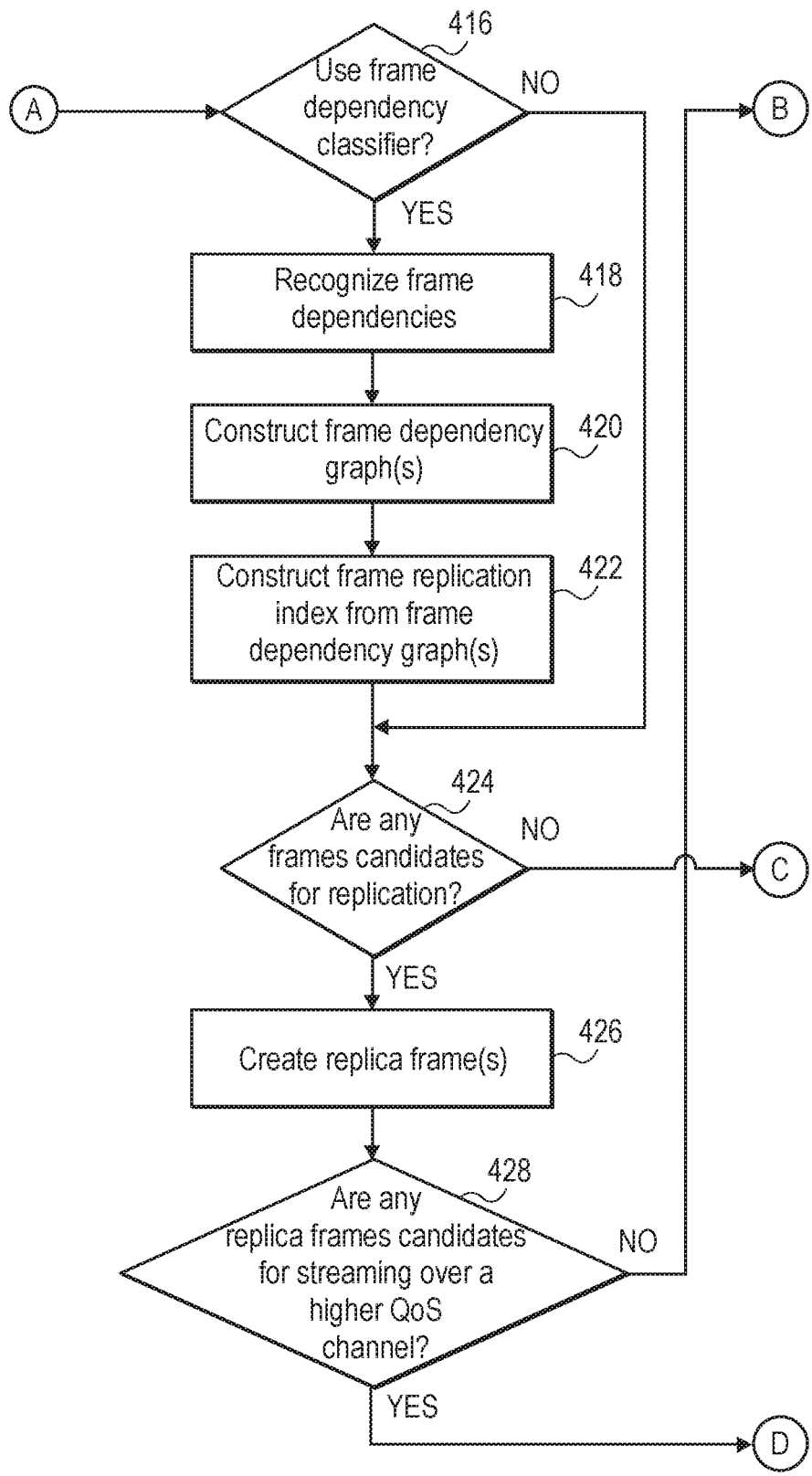
Figure 4C:
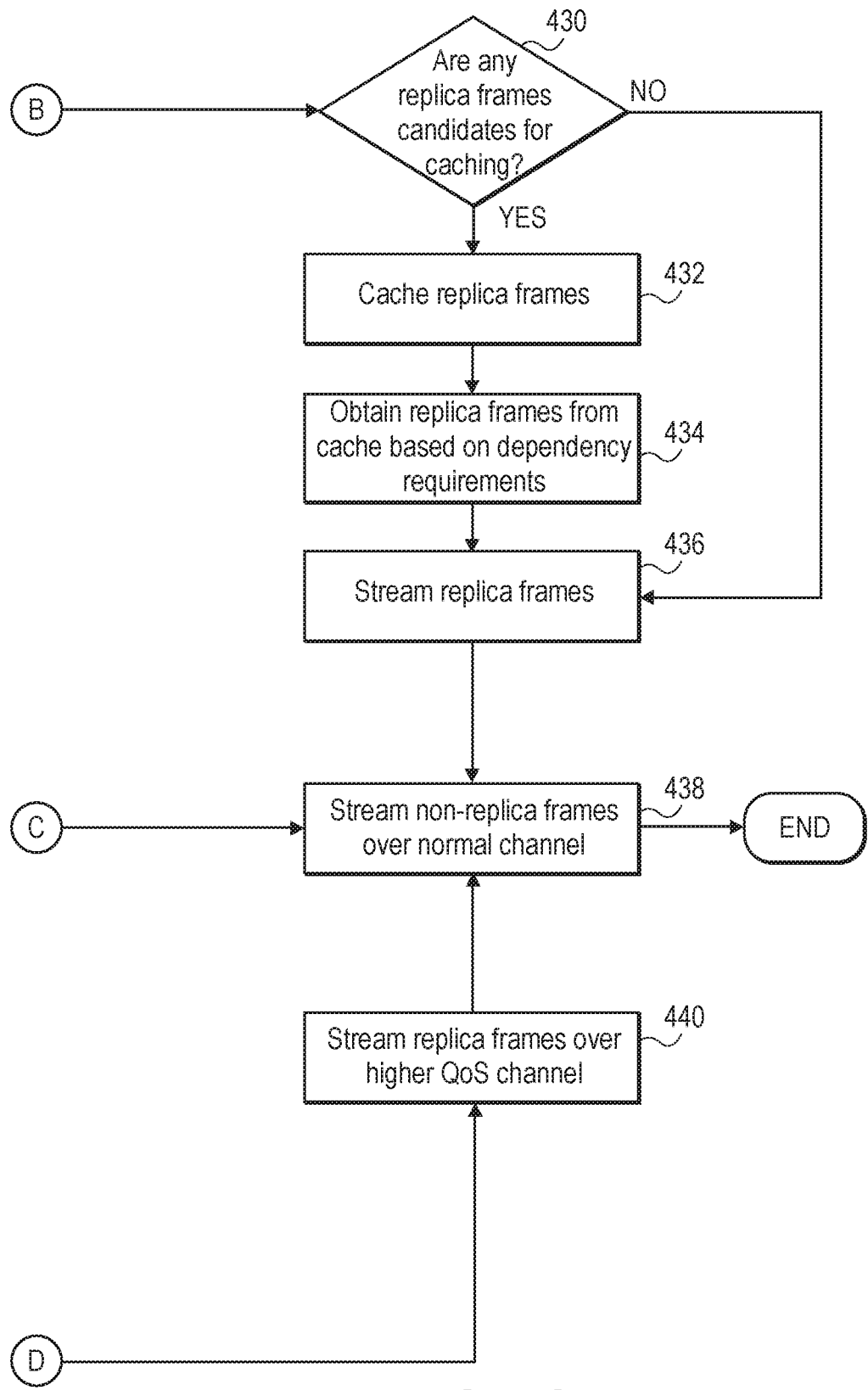

FIGS. 4A-C illustrate a flowchart 400 for an example embodiment of video streaming using varying per-frame quality of service (QoS). In some cases, flowchart 400 may be implemented using the video streaming embodiments and functionality described throughout this disclosure.

The flowchart begins at block 402, where a video stream is captured, sampled, and/or sensed by a camera. In some embodiments, for example, the video stream may include a sequence of video frames. Moreover, in some embodiments, the video stream may be encoded using a video frame encoding algorithm.

The flowchart then proceeds to block 404 to determine whether a video content classifier should be used to identify the underlying content in the video stream. In some cases, for example, a video content classifier may be used to identify the underlying content in the video stream, such as for the purpose of applying security protections and/or searching the video stream more efficiently. For example, one or more security protections may be selectively applied to certain frames of the video stream based on the underlying content recognized by the video content classifier, which may be dictated by a security policy. As another example, an index of the underlying content recognized by the video content classifier may be generated for each frame, thus enabling the video stream to be searched more efficiently (e.g., based on keyword and/or natural language queries).

If it is determined at block 404 that a video content classifier should not be used, the flowchart then proceeds to block 410, as described below.

If it is determined at block 404 that a video content classifier should be used, however, the flowchart then proceeds to block 406 to recognize objects and/or content in each frame using the video content classifier. In some embodiments, for example, the video content classifier may be implemented using artificial intelligence (AI) and/or machine learning (ML) techniques, such as a convolution neural network (CNN) trained to recognize objects and/or actions in a video stream and/or video frames.

The flowchart then proceeds to block 408 to create an object index for each frame based on the objects and/or content recognized by the video content classifier. In some embodiments, for example, the object index for a particular frame may be represented using a frame metadata structure that contains an index of objects recognized by the video content classifier.

The flowchart then proceeds to block 410 to determine whether selective frame protection should be applied to the video stream. In some cases, for example, one or more security protections may be selectively applied to certain frames of the video stream based on the underlying content recognized by the video content classifier, which may be dictated by a security policy. For example, the security policy may require certain confidentiality and/or integrity protections (e.g., encryption, compression, and/or integrity protection) to be applied to frames of the video stream that contain sensitive content, such as content that is privacy-sensitive and/or confidential.

If it is determined at block 410 that selective frame protection should not be applied to the video stream, the flowchart then proceeds to block 416, as described below.

If it is determined at block 410 that selective frame protection should be applied to the video stream, however, the flowchart then proceeds to block 412 to obtain a stream protection or security policy. For example, the stream protection policy may describe or indicate certain types of objects, actions, and/or other content that require encryption, integrity protection, and/or compression. The flowchart then proceeds to block 414 to apply the appropriate protections to certain frames based on the protection policy and/or the underlying video content.

The flowchart then proceeds to block 416 to determine whether a frame dependency classifier should be used to recognize dependencies among the frames in the video stream. In some cases, for example, a frame dependency classifier may be used to recognize frame dependencies for the purpose of selectively transmitting frames in the video stream to the corresponding destination using different transmission methods with varying levels of reliability and/or quality of service. For example, the frame dependencies may be evaluated in order to identify frames that are crucial to the overall quality of service (QoS) of the video stream (e.g., frames that are associated with a larger number of dependencies), and those frames may then be prioritized and delivered using more reliable mechanisms than other frames in the video stream.

In some cases, for example, the frames may be partitioned into different subsets of frames based on their respective degrees of dependency couplings, and the respective subsets of frames may be transmitted using different transmission methods. For example, one or more subsets of frames with higher degrees of dependency coupling may be prioritized for transmission using more reliable transmission methods with higher quality of service, while one or more subsets of frames with lower degrees of dependency coupling may be transmitted using less reliable transmission methods with lower quality of service.

In various embodiments, for example, the more reliable delivery mechanisms used for frames with higher degrees of dependency coupling may include (1) transmitting the frames using QoS streaming protocols that provide higher reliability (e.g., using the resource reservation protocol (RSVP) or other higher-QoS transmission methods, protocols, and/or techniques), (2) transmitting multiple replicated or redundant copies of the frames, and/or (3) caching the frames at edge resources deployed near the consuming end users to facilitate fast and reliable delivery.

If it is determined at block 416 that a frame dependency classifier should not be used, the flowchart then proceeds to block 424, as described below.

If it is determined at block 416 that a frame dependency classifier should be used, however, the flowchart then proceeds to block 418 to recognize dependencies among the frames using the frame dependency classifier. In some embodiments, for example, the frame dependencies recognized by the frame dependency classifier may include dependencies among non-key frames and key frames, dependencies among frames protected with common encryption and/or integrity keys (e.g., MAC keys), and/or dependencies imposed among frames due to encryption, integrity (e.g., MAC protection), and/or compression algorithms that span multiple frames, among other examples.

The flowchart then proceeds to block 420 to construct a frame dependency graph based on the frame dependencies identified by the frame dependency classifier. In some embodiments, for example, the frame dependency graph may include one or more graph-based structures with nodes representing the video frames and edges representing the dependencies and/or relationships among the video frames.

The flowchart then proceeds to block 422 to construct a frame replication index from the frame dependency graph. For example, the frame replication index may contain a representation of the frame dependency graph, an object index for each frame, and/or a designation of the priority and/or importance of each frame based on frame dependencies (e.g., key frames, non-key frames, replica frames).

The flowchart then proceeds to block 424 to determine whether any frames are candidates for replication based on the frame replication index. In some cases, for example, certain frames may be identified as replica frames based on the frame dependencies and/or designations in the frame replication index. For example, certain frames with a high degree of dependency coupling may be identified as replica frames, such as key frames with a high degree of compression and/or encoding dependency coupling, and/or frames with a high degree of security dependency coupling, among other examples.

If it is determined at block 424 that certain frames are not candidates for replication, the flowchart then proceeds to block 438, as described below.

If it is determined at block 424 that certain frames are candidates for replication, however, the flowchart then proceeds to block 426 to create replica frame(s) for the identified frames. In some cases, for example, the replica frames may be duplicated for the purpose of transmitting multiple redundant or replicated copies of the replica frames, and/or the frames may be designated as replica frames for the purpose of transmission using more reliable transmission methods.

The flowchart then proceeds to block 428 to determine whether any replica frames are candidates for streaming over a channel with higher quality of service (QoS). In some cases, for example, certain replica or key frames with a high degree of coupling dependency may be streamed or transmitted over a channel that provides higher QoS or reliability.

If it is determined at block 428 that certain replica frames are candidates for streaming over a higher QoS channel, the flowchart then proceeds to block 440 to stream the replica frames to the corresponding destination over the higher QoS channel.

The flowchart then proceeds to block 438 to stream the remaining frames to the corresponding destination over the normal video streaming channel with a lower QoS.

If it is determined at block 428 that certain replica frames are not candidates for streaming over a higher QoS channel, the flowchart then proceeds to block 430 to determine whether any replica frames are candidates for caching at network resources deployed near the consuming end users. In some cases, for example, certain replica frames may be transmitted to and/or cached at network resources deployed near the consuming end users (e.g., edge nodes and/or other edge resources) to facilitate fast and reliable delivery, such as computing nodes associated with a blockchain network, a distributed hash table (DHT), and/or another caching or queuing scheme.

If it is determined at block 430 that certain replica frames are candidates for caching, the flowchart then proceeds to block 432 to transmit the replica frames to the appropriate network resource(s) near the consuming end users where the replica frames are to be cached, such as on one or more edge nodes associated with a blockchain network, a distributed hash table (DHT), and/or another caching or queuing scheme.

The flowchart then proceeds to block 434 to obtain the replica frames from the cache as needed based on dependency requirements, such as when a particular end user or destination needs the replica frames to decode the video stream. The flowchart then proceeds to block 436 to stream the replica frames from the network resources where they are cached to the corresponding destination over a video streaming channel.

In some cases, the frame replication index may also be cached with the replica frames and/or transmitted to the corresponding destination to enable the original sequence of frames in the video stream to be reconstructed or reassembled.

If it is determined at block 430 that certain replica frames are not candidates for caching, however, the flowchart proceeds directly to block 436 to stream the replica frames (and/or the frame replication index) to the corresponding destination over a video streaming channel.

The flowchart then proceeds to block 438 to stream the non-replica frames to the corresponding destination over a normal or regular video streaming channel. In some cases, for example, non-replica frames with a lower degree of dependency coupling (e.g., non-key frames) may be streamed over a channel with a lower quality of service (QoS) than that used for the replica frames.

At this point, the flowchart may be complete. In some embodiments, however, the flowchart may restart and/or certain blocks may be repeated. For example, in some embodiments, the flowchart may restart at block 402 to continue capturing and streaming video frames.

Example Internet-of-Things (IoT) Implementations

FIGS. 5-8 illustrate examples of Internet-of-Things (IoT) networks and devices that can be used in accordance with embodiments disclosed herein. For example, the operations and functionality described throughout this disclosure may be embodied by an IoT device or machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 5:
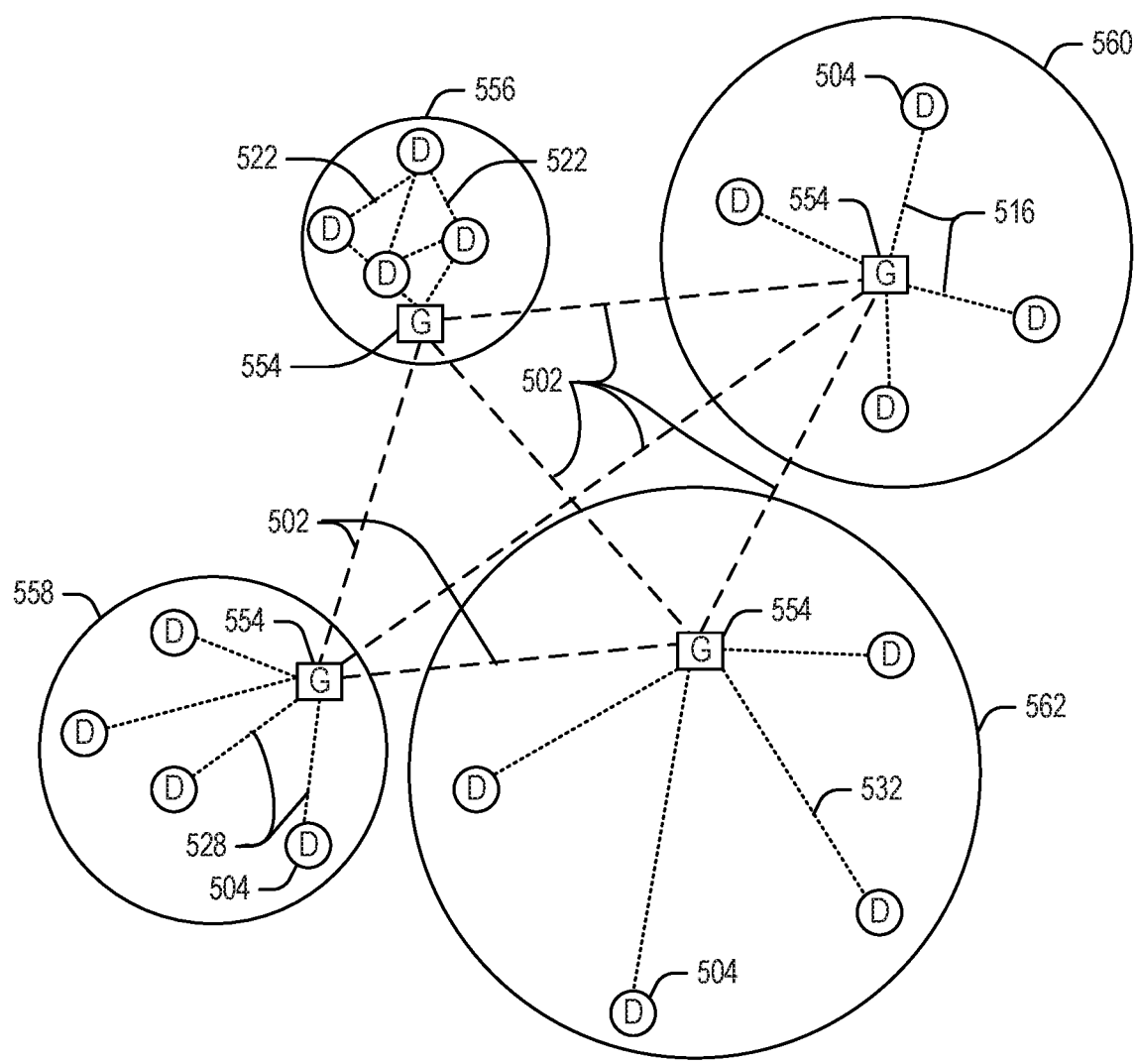
FIGS. 5, 6, 7, and 8 illustrate examples of Internet-of-Things (IoT) networks and architectures that can be used in accordance with certain embodiments.

FIG. 5 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 5-8, present a number of new challenges in a heterogeneous network of connectivity comprising a combination of wired and wireless technologies.

FIG. 5 specifically provides a simplified drawing of a domain topology that may be used for a number of internet-of-things (IoT) networks comprising IoT devices 504, with the IoT networks 556, 558, 560, 562, coupled through backbone links 502 to respective gateways 554. For example, a number of IoT devices 504 may communicate with a gateway 554, and with each other through the gateway 554. To simplify the drawing, not every IoT device 504, or communications link (e.g., link 516, 522, 528, or 532) is labeled. The backbone links 502 may include any number of wired or wireless technologies, including optical networks, and may be part of a local area network (LAN), a wide area network (WAN), or the Internet. Additionally, such communication links facilitate optical signal paths among both IoT devices 504 and gateways 554, including the use of MUXing/deMUXing components that facilitate interconnection of the various devices.

The network topology may include any number of types of IoT networks, such as a mesh network provided with the network 556 using Bluetooth low energy (BLE) links 522. Other types of IoT networks that may be present include a wireless local area network (WLAN) network 558 used to communicate with IoT devices 504 through IEEE 802.11 (Wi-Fi®) links 528, a cellular network 560 used to communicate with IoT devices 504 through an LTE/LTE-A (4G) or 5G cellular network, and a low-power wide area (LPWA) network 562, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 504, such as over the backbone links 502, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 556, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 558, for instance, may use systems that perform standards conversion to provide multi-standard connectivity, enabling IoT devices 504 using different protocols to communicate. Further systems may provide seamless interconnectivity across a multi-standard infrastructure comprising visible Internet resources and hidden Internet resources.

Communications in the cellular network 560, for instance, may be enhanced by systems that offload data, extend communications to more remote devices, or both. The LPWA network 562 may include systems that perform non-Internet protocol (IP) to IP interconnections, addressing, and routing. Further, each of the IoT devices 504 may include the appropriate transceiver for wide area communications with that device. Further, each IoT device 504 may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 6 below.

Figure 6:
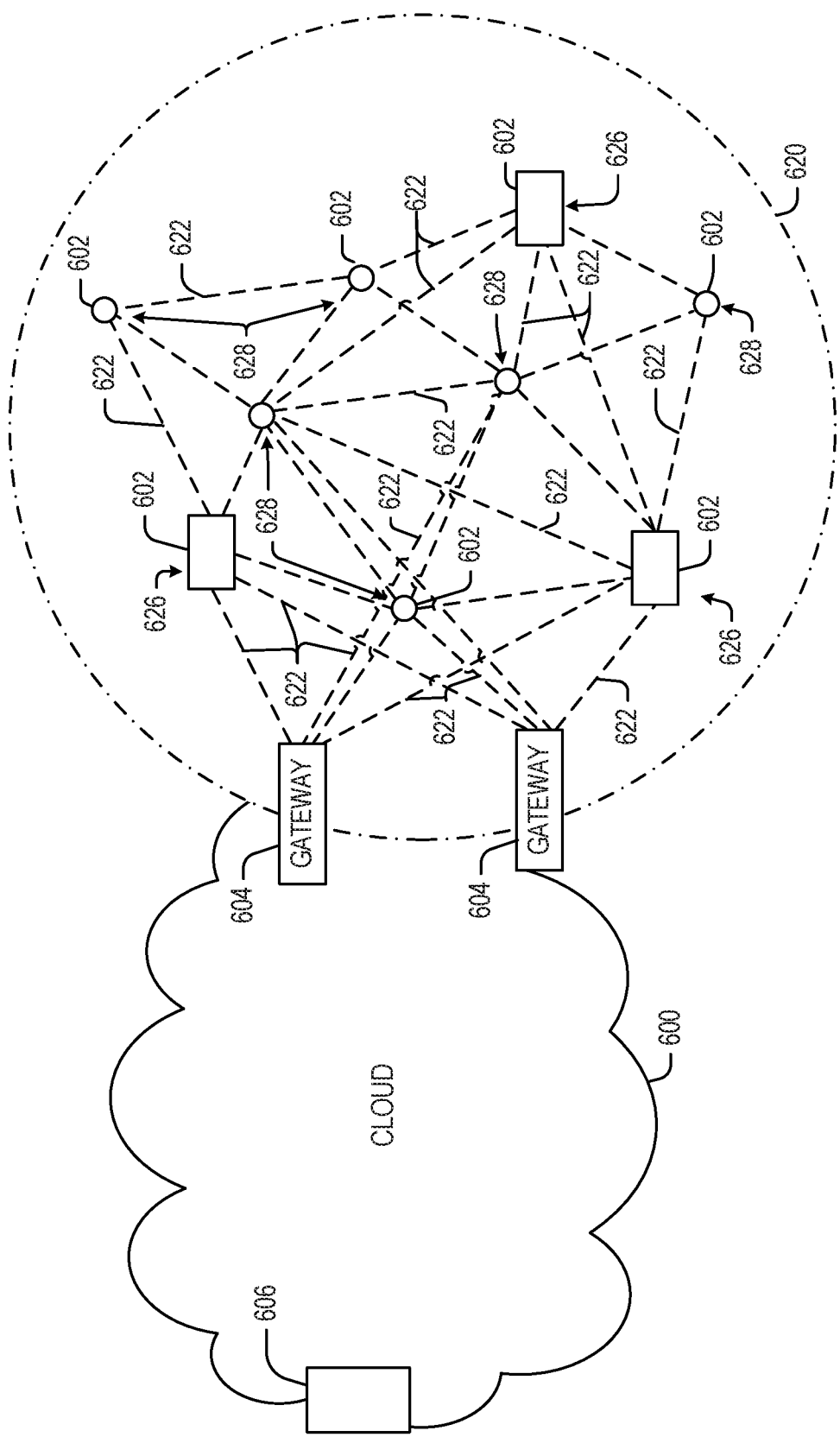

FIG. 6 illustrates a cloud computing network in communication with a mesh network of IoT devices (devices 602) operating as a fog device at the edge of the cloud computing network. The mesh network of IoT devices may be termed a fog 620, operating at the edge of the cloud 600. To simplify the diagram, not every IoT device 602 is labeled.

The fog 620 may be considered to be a massively interconnected network wherein a number of IoT devices 602 are in communications with each other, for example, by radio links 622. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 602 are shown in this example, gateways 604, data aggregators 626, and sensors 628, although any combinations of IoT devices 602 and functionality may be used. The gateways 604 may be edge devices that provide communications between the cloud 600 and the fog 620, and may also provide the backend process function for data obtained from sensors 628, such as motion data, flow data, temperature data, and the like. The data aggregators 626 may collect data from any number of the sensors 628, and perform the back-end processing function for the analysis. The results, raw data, or both may be passed along to the cloud 600 through the gateways 604. The sensors 628 may be full IoT devices 602, for example, capable of both collecting data and processing the data. In some cases, the sensors 628 may be more limited in functionality, for example, collecting the data and allowing the data aggregators 626 or gateways 604 to process the data.

Communications from any IoT device 602 may be passed along a convenient path (e.g., a most convenient path) between any of the IoT devices 602 to reach the gateways 604. In these networks, the number of interconnections provide substantial redundancy, allowing communications to be maintained, even with the loss of a number of IoT devices 602. Further, the use of a mesh network may allow IoT devices 602 that are very low power or located at a distance from infrastructure to be used, as the range to connect to another IoT device 602 may be much less than the range to connect to the gateways 604.

The fog 620 provided from these IoT devices 602 may be presented to devices in the cloud 600, such as a server 606, as a single device located at the edge of the cloud 600, e.g., a fog device. In this example, the alerts coming from the fog device may be sent without being identified as coming from a specific IoT device 602 within the fog 620. In this fashion, the fog 620 may be considered a distributed platform that provides computing and storage resources to perform processing or data-intensive tasks such as data analytics, data aggregation, and machine-learning, among others.

In some examples, the IoT devices 602 may be configured using an imperative programming style, e.g., with each IoT device 602 having a specific function and communication partners. However, the IoT devices 602 forming the fog device may be configured in a declarative programming style, allowing the IoT devices 602 to reconfigure their operations and communications, such as to determine needed resources in response to conditions, queries, and device failures. As an example, a query from a user located at a server 606 about the operations of a subset of equipment monitored by the IoT devices 602 may result in the fog 620 device selecting the IoT devices 602, such as particular sensors 628, needed to answer the query. The data from these sensors 628 may then be aggregated and analyzed by any combination of the sensors 628, data aggregators 626, or gateways 604, before being sent on by the fog 620 device to the server 606 to answer the query. In this example, IoT devices 602 in the fog 620 may select the sensors 628 used based on the query, such as adding data from flow sensors or temperature sensors. Further, if some of the IoT devices 602 are not operational, other IoT devices 602 in the fog 620 device may provide analogous data, if available.

Figure 7:
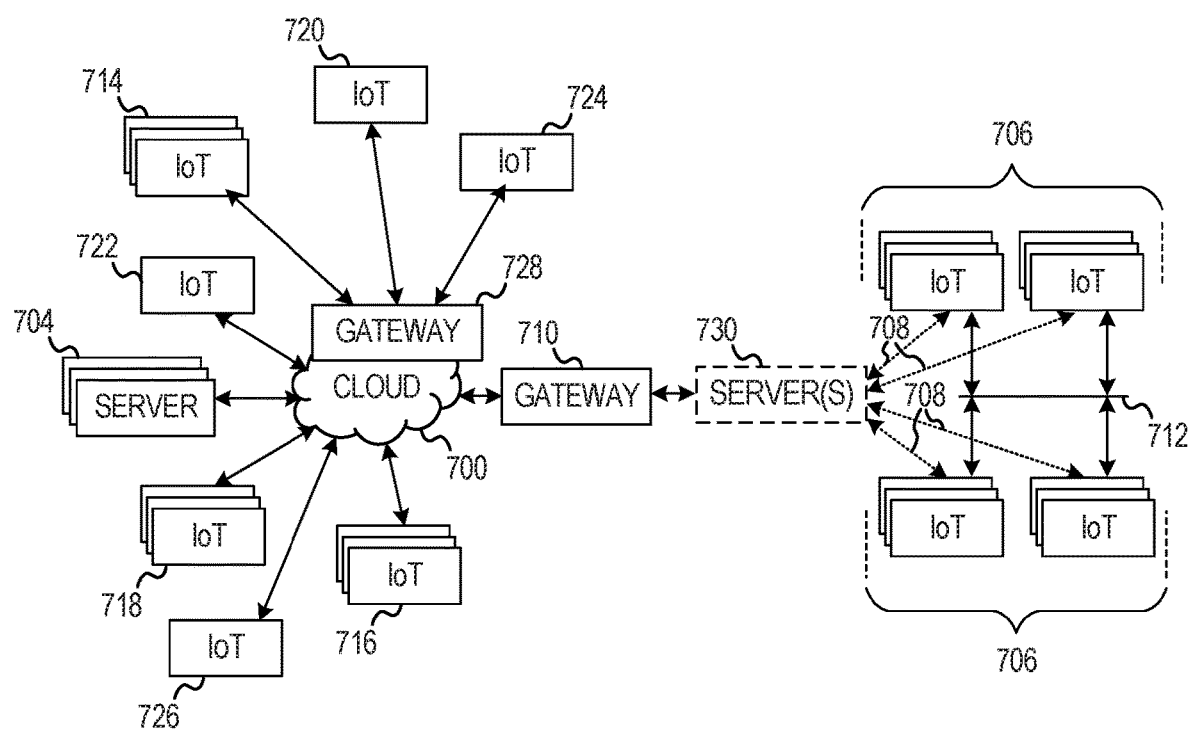

FIG. 7 illustrates a drawing of a cloud computing network, or cloud 700, in communication with a number of Internet of Things (IoT) devices. The cloud 700 may represent the Internet, or may be a local area network (LAN), or a wide area network (WAN), such as a proprietary network for a company. The IoT devices may include any number of different types of devices, grouped in various combinations. For example, a traffic control group 706 may include IoT devices along streets in a city. These IoT devices may include stoplights, traffic flow monitors, cameras, weather sensors, and the like. The traffic control group 706, or other subgroups, may be in communication with the cloud 700 through wired or wireless links 708, such as LPWA links, optical links, and the like. Further, a wired or wireless sub-network 712 may allow the IoT devices to communicate with each other, such as through a local area network, a wireless local area network, and the like. The IoT devices may use another device, such as a gateway 710 or 728 to communicate with remote locations such as the cloud 700; the IoT devices may also use one or more servers 730 to facilitate communication with the cloud 700 or with the gateway 710. For example, the one or more servers 730 may operate as an intermediate network node to support a local edge cloud or fog implementation among a local area network. Further, the gateway 728 that is depicted may operate in a cloud-to-gateway-to-many edge devices configuration, such as with the various IoT devices 714, 720, 724 being constrained or dynamic to an assignment and use of resources in the cloud 700.

Other example groups of IoT devices may include remote weather stations 714, local information terminals 716, alarm systems 718, automated teller machines 720, alarm panels 722, or moving vehicles, such as emergency vehicles 724 or other vehicles 726, among many others. Each of these IoT devices may be in communication with other IoT devices, with servers 704, with another IoT fog device or system (not shown, but depicted in FIG. 6), or a combination therein. The groups of IoT devices may be deployed in various residential, commercial, and industrial settings (including in both private or public environments).

As can be seen from FIG. 7, a large number of IoT devices may be communicating through the cloud 700. This may allow different IoT devices to request or provide information to other devices autonomously. For example, a group of IoT devices (e.g., the traffic control group 706) may request a current weather forecast from a group of remote weather stations 714, which may provide the forecast without human intervention. Further, an emergency vehicle 724 may be alerted by an automated teller machine 720 that a burglary is in progress. As the emergency vehicle 724 proceeds towards the automated teller machine 720, it may access the traffic control group 706 to request clearance to the location, for example, by lights turning red to block cross traffic at an intersection in sufficient time for the emergency vehicle 724 to have unimpeded access to the intersection.

Clusters of IoT devices, such as the remote weather stations 714 or the traffic control group 706, may be equipped to communicate with other IoT devices as well as with the cloud 700. This may allow the IoT devices to form an ad-hoc network between the devices, allowing them to function as a single device, which may be termed a fog device or system (e.g., as described above with reference to FIG. 6).

Figure 8:
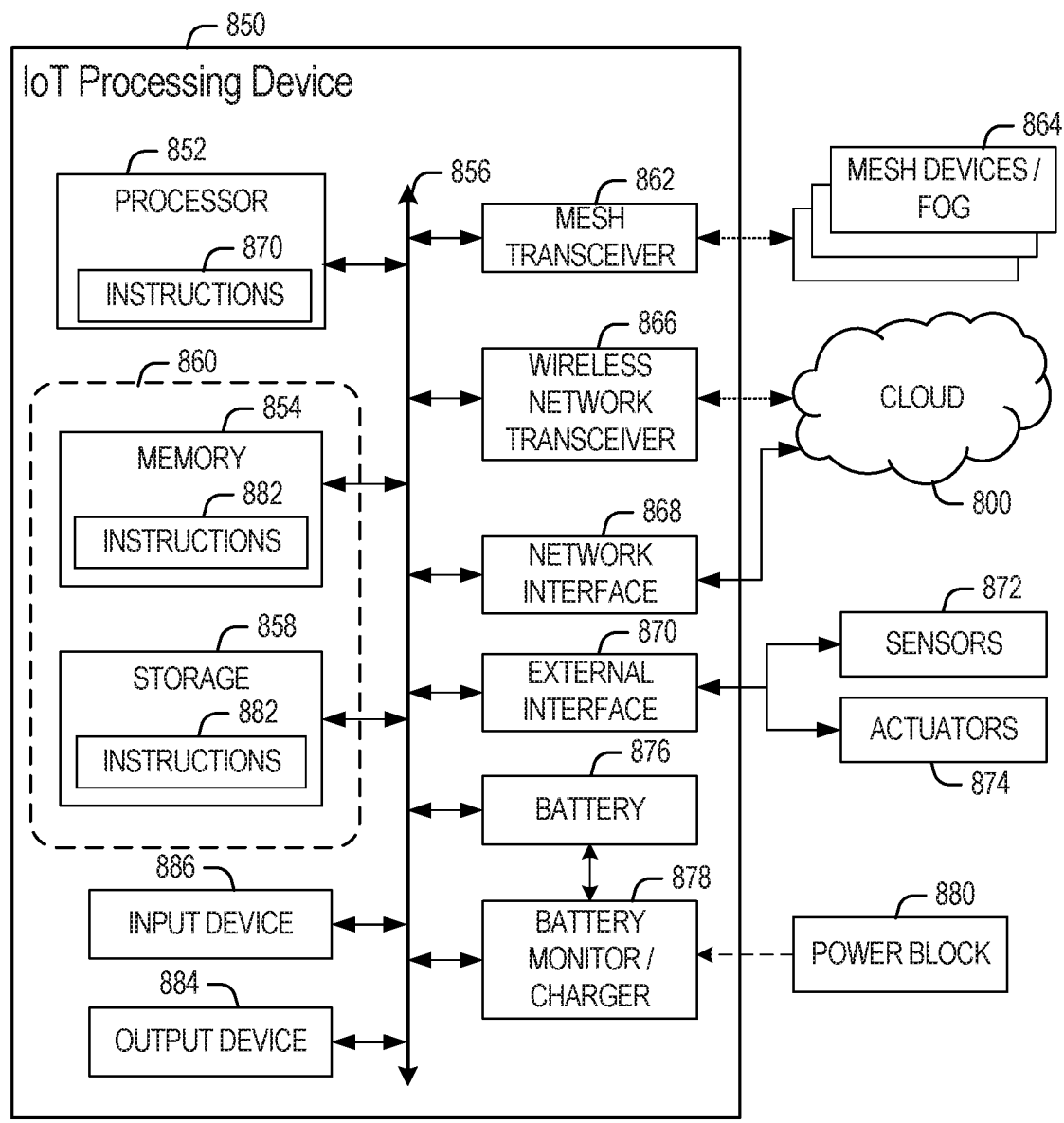

FIG. 8 is a block diagram of an example of components that may be present in an IoT device 850 for implementing the techniques described herein. The IoT device 850 may include any combinations of the components shown in the example or referenced in the disclosure above. The components may be implemented as ICs, portions thereof, discrete electronic devices, or other modules, logic, hardware, software, firmware, or a combination thereof adapted in the IoT device 850, or as components otherwise incorporated within a chassis of a larger system. Additionally, the block diagram of FIG. 8 is intended to depict a high-level view of components of the IoT device 850. However, some of the components shown may be omitted, additional components may be present, and different arrangement of the components shown may occur in other implementations.

The IoT device 850 may include a processor 852, which may be a microprocessor, a multi-core processor, a multi-threaded processor, an ultra-low voltage processor, an embedded processor, or other known processing element. The processor 852 may be a part of a system on a chip (SoC) in which the processor 852 and other components are formed into a single integrated circuit, or a single package, such as the Edison™ or Galileo™ SoC boards from Intel. As an example, the processor 852 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 852 may communicate with a system memory 854 over an interconnect 856 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 858 may also couple to the processor 852 via the interconnect 856. In an example, the storage 858 may be implemented via a solid state disk drive (SSDD). Other devices that may be used for the storage 858 include flash memory cards, such as SD cards, microSD cards, xD picture cards, and the like, and USB flash drives. In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in a SoC based system. Other bus systems may be included, such as an I2C interface, an SPI interface, point to point interfaces, and a power bus, among others.

The interconnect 856 may couple the processor 852 to a mesh transceiver 862, for communications with other mesh devices 864. The mesh transceiver 862 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 864. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 862 may communicate using multiple standards or radios for communications at different range. For example, the IoT device 850 may communicate with close devices, e.g., within about 10 meters, using a local transceiver based on BLE, or another low power radio, to save power. More distant mesh devices 864, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 866 may be included to communicate with devices or services in the cloud 800 via local or wide area network protocols. The wireless network transceiver 866 may be a LPWA transceiver that follows the IEEE 802.15.4, or IEEE 802.15.4g standards, among others. The IoT device 850 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 862 and wireless network transceiver 866, as described herein. For example, the radio transceivers 862 and 866 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 862 and 866 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 866, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 868 may be included to provide a wired communication to the cloud 800 or to other devices, such as the mesh devices 864. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to allow connect to a second network, for example, a NIC 868 providing communications to the cloud over Ethernet, and a second NIC 868 providing communications to other devices over another type of network.

The interconnect 856 may couple the processor 852 to an external interface 870 that is used to connect external devices or subsystems. The external devices may include sensors 872, such as accelerometers, level sensors, flow sensors, optical light sensors, camera sensors, temperature sensors, a global positioning system (GPS) sensors, pressure sensors, barometric pressure sensors, and the like. The external interface 870 further may be used to connect the IoT device 850 to actuators 874, such as power switches, valve actuators, an audible sound generator, a visual warning device, and the like.

In some optional examples, various input/output (I/O) devices may be present within, or connected to, the IoT device 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 850.

A battery 876 may power the IoT device 850, although in examples in which the IoT device 850 is mounted in a fixed location, it may have a power supply coupled to an electrical grid. The battery 876 may be a lithium ion battery, or a metal-air battery, such as a zinc-air battery, an aluminum-air battery, a lithium-air battery, and the like.

A battery monitor/charger 878 may be included in the IoT device 850 to track the state of charge (SoCh) of the battery 876. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2790 from Linear Technologies, an ADT7488A from ON Semiconductor of Phoenix Ariz., or an IC from the UCD90xxx family from Texas Instruments of Dallas, Tex. The battery monitor/charger 878 may communicate the information on the battery 876 to the processor 852 over the interconnect 856. The battery monitor/charger 878 may also include an analog-to-digital (ADC) convertor that allows the processor 852 to directly monitor the voltage of the battery 876 or the current flow from the battery 876. The battery parameters may be used to determine actions that the IoT device 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the IoT device 850. A wireless battery charging circuit, such as an LTC4020 chip from Linear Technologies of Milpitas, Calif., among others, may be included in the battery monitor/charger 878. The specific charging circuits chosen depend on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine readable medium 860 including code to direct the processor 852 to perform electronic operations in the IoT device 850. The processor 852 may access the non-transitory, machine readable medium 860 over the interconnect 856. For instance, the non-transitory, machine readable medium 860 may include storage units such as optical disks, flash drives, or any number of other hardware devices. The non-transitory, machine readable medium 860 may include instructions to direct the processor 852 to perform a specific sequence or flow of actions, for example, as described with respect to the flowchart(s) and diagram(s) of operations and functionality described throughout this disclosure.

Example Computing Architectures

Figure 9:
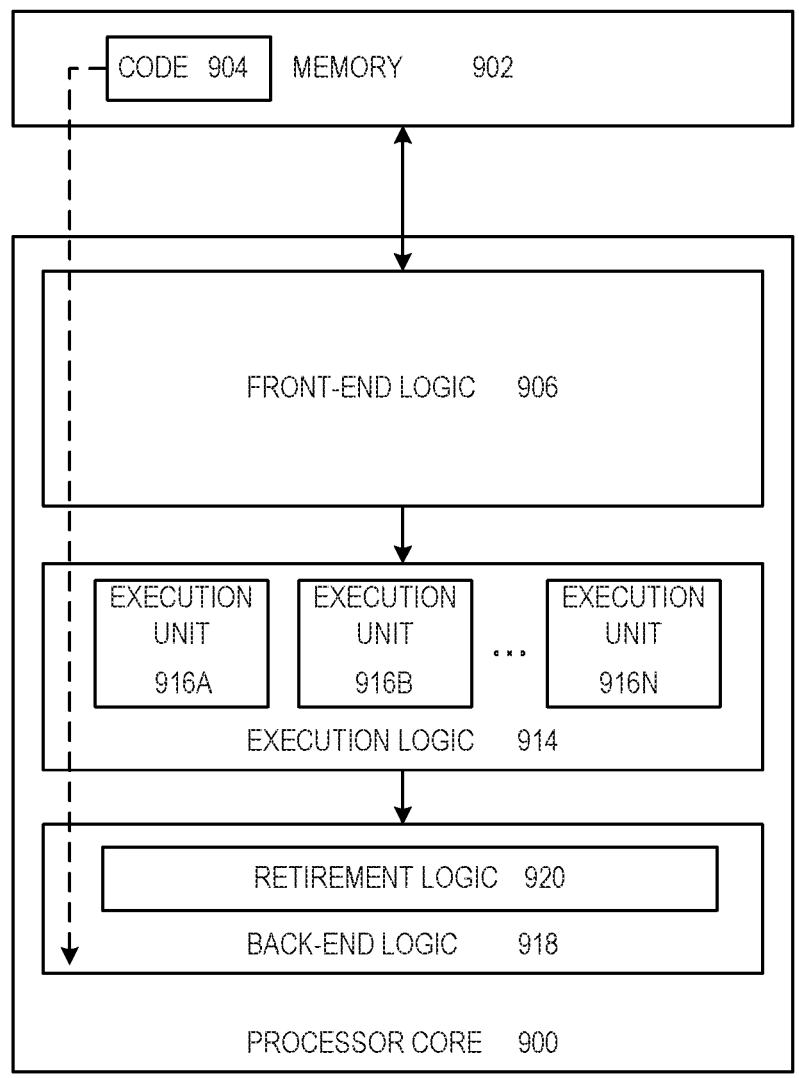
FIGS. 9 and 10 illustrate example computer architectures that can be used in accordance with certain embodiments.
Figure 10:
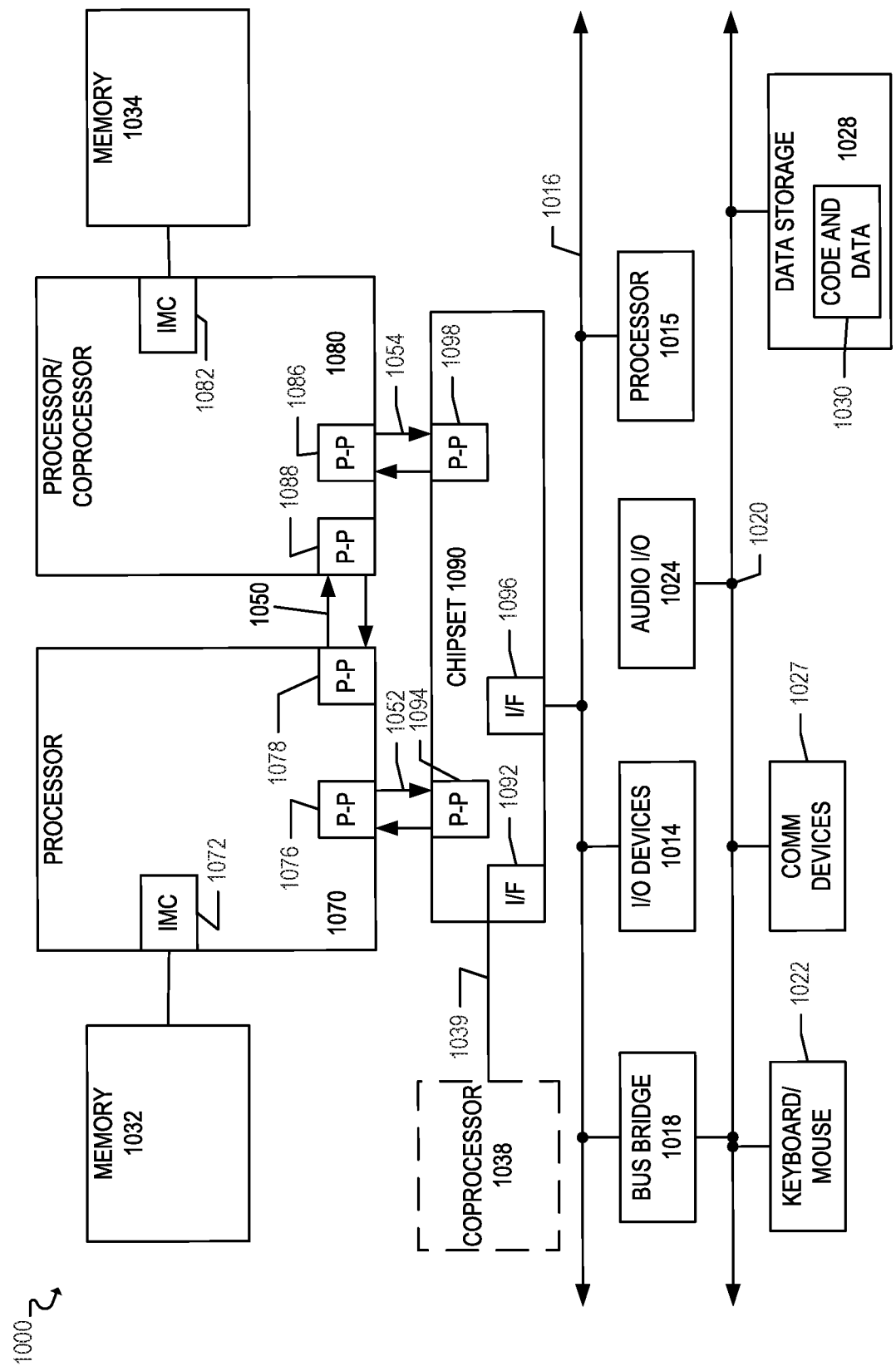

FIGS. 9 and 10 illustrate example computer processor architectures that can be used in accordance with embodiments disclosed herein. For example, in various embodiments, the computer architectures of FIGS. 9 and 10 may be used to implement the functionality described throughout this disclosure. Other embodiments may use other processor and system designs and configurations known in the art, for example, for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 9 illustrates a block diagram for an example embodiment of a processor 900. Processor 900 is an example of a type of hardware device that can be used in connection with the embodiments described throughout this disclosure. Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 900 can execute any type of instructions associated with algorithms, processes, or operations detailed herein. Generally, processor 900 can transform an element or an article (e.g., data) from one state or thing to another state or thing.

Code 904, which may be one or more instructions to be executed by processor 900, may be stored in memory 902, or may be stored in software, hardware, firmware, or any suitable combination thereof, or in any other internal or external component, device, element, or object where appropriate and based on particular needs. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 may also include register renaming logic and scheduling logic, which generally allocate resources and queue the operation corresponding to the instruction for execution.

Processor 900 can also include execution logic 914 having a set of execution units 916a, 916b, 916n, etc. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but requires in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

FIG. 10 illustrates a block diagram for an example embodiment of a multiprocessor 1000. As shown in FIG. 10, multiprocessor system 1000 is a point-to-point interconnect system, and includes a first processor 1070 and a second processor 1080 coupled via a point-to-point interconnect 1050. In some embodiments, each of processors 1070 and 1080 may be some version of processor 900 of FIG. 9.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, matrix processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of this disclosure is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), matrix processors, field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

All or part of any component of FIG. 10 may be implemented as a separate or stand-alone component or chip, or may be integrated with other components or chips, such as a system-on-a-chip (SoC) that integrates various computer components into a single chip.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The machine-readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein. In another example, the machine-readable instructions may be stored in a state in which they may be read by a computer, but require addition of a library (e.g., a dynamic link library), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine readable instructions and/or program(s) when stored or otherwise at rest or in transit.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as standalone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include an apparatus, comprising: a network interface to communicate over a network; and processing circuitry to: receive, via the network interface, a video stream comprising a plurality of video frames; identify a plurality of dependencies among the plurality of video frames; identify, based on the plurality of dependencies, a first subset of video frames to be transmitted using a first transmission method and a second subset of video frames to be transmitted using a second transmission method, wherein the first subset of video frames and the second subset of video frames are identified from the plurality of video frames, and wherein the first transmission method provides a higher quality of service than the second transmission method; transmit, via the network interface, the first subset of video frames to a corresponding destination using the first transmission method; and transmit, via the network interface, the second subset of video frames to the corresponding destination using the second transmission method.

In one example embodiment of an apparatus, the plurality of dependencies comprises: a plurality of frame compression dependencies associated with a compression scheme applied to the video stream; or a plurality of frame protection dependencies associated with one or more security protections applied to the video stream.

In one example embodiment of an apparatus, the processing circuitry to identify, based on the plurality of dependencies, the first subset of video frames to be transmitted using the first transmission method and the second subset of video frames to be transmitted using the second transmission method is further to: determine, based on the plurality of dependencies, that the first subset of video frames corresponds to a larger number of dependencies than the second subset of video frames.

In one example embodiment of an apparatus: the first transmission method comprises transmitting the first subset of video frames over a first channel having a first quality of service level; and the second transmission method comprises transmitting the second subset of video frames over a second channel having a second quality of service level; wherein the first quality of service level is higher than the second quality of service level.

In one example embodiment of an apparatus: the first transmission method comprises transmitting a plurality of replicated copies of the first subset of video frames; and the second transmission method comprises transmitting a single copy of the second subset of video frames.

In one example embodiment of an apparatus: the first transmission method comprises transmitting the first subset of video frames to one or more distributed computing devices to be cached, wherein the one or more distributed computing devices are to transmit the first subset of video frames to the corresponding destination; and the second transmission method comprises transmitting the second subset of video frames to the corresponding destination.

In one example embodiment of an apparatus, the one or more distributed computing devices are associated with: a blockchain network; or a distributed hash table.

In one example embodiment of an apparatus, the processing circuitry is further to: recognize video content in the plurality of video frames based on a video content classifier; identify one or more video frames comprising sensitive content, wherein the one or more video frames are identified from the plurality of video frames based on the video content recognized by the video content classifier; and apply one or more security protections to the one or more video frames.

One or more embodiments may include at least one non-transitory machine accessible storage medium having instructions stored thereon, wherein the instructions, when executed on a machine, cause the machine to: receive, via a network interface, a video stream comprising a plurality of video frames; identify a plurality of dependencies among the plurality of video frames; identify, based on the plurality of dependencies, a first subset of video frames to be transmitted using a first transmission method and a second subset of video frames to be transmitted using a second transmission method, wherein the first subset of video frames and the second subset of video frames are identified from the plurality of video frames, and wherein the first transmission method provides a higher quality of service than the second transmission method; transmit, via the network interface, the first subset of video frames to a corresponding destination using the first transmission method; and transmit, via the network interface, the second subset of video frames to the corresponding destination using the second transmission method.

In one example embodiment of a storage medium, the plurality of dependencies comprises: a plurality of frame compression dependencies associated with a compression scheme applied to the video stream; or a plurality of frame protection dependencies associated with one or more security protections applied to the video stream.

In one example embodiment of a storage medium, the instructions that cause the machine to identify, based on the plurality of dependencies, the first subset of video frames to be transmitted using the first transmission method and the second subset of video frames to be transmitted using the second transmission method further cause the machine to: determine, based on the plurality of dependencies, that the first subset of video frames corresponds to a larger number of dependencies than the second subset of video frames.

In one example embodiment of a storage medium: the first transmission method comprises transmitting the first subset of video frames over a first channel having a first quality of service level; and the second transmission method comprises transmitting the second subset of video frames over a second channel having a second quality of service level; wherein the first quality of service level is higher than the second quality of service level.

In one example embodiment of a storage medium: the first transmission method comprises transmitting a plurality of replicated copies of the first subset of video frames; and the second transmission method comprises transmitting a single copy of the second subset of video frames.

In one example embodiment of a storage medium: the first transmission method comprises transmitting the first subset of video frames to one or more distributed computing devices to be cached, wherein the one or more distributed computing devices are to transmit the first subset of video frames to the corresponding destination; and the second transmission method comprises transmitting the second subset of video frames to the corresponding destination.

In one example embodiment of a storage medium, the instructions further cause the machine to: recognize video content in the plurality of video frames based on a video content classifier; identify one or more video frames comprising sensitive content, wherein the one or more video frames are identified from the plurality of video frames based on the video content recognized by the video content classifier; and apply one or more security protections to the one or more video frames.

One or more embodiments may include a method, comprising: receiving, via a network interface, a video stream comprising a plurality of video frames; identifying a plurality of dependencies among the plurality of video frames; identifying, based on the plurality of dependencies, a first subset of video frames to be transmitted using a first transmission method and a second subset of video frames to be transmitted using a second transmission method, wherein the first subset of video frames and the second subset of video frames are identified from the plurality of video frames, and wherein the first transmission method provides a higher quality of service than the second transmission method; transmitting, via the network interface, the first subset of video frames to a corresponding destination using the first transmission method; and transmitting, via the network interface, the second subset of video frames to the corresponding destination using the second transmission method.

In one example embodiment of a method, the plurality of dependencies comprises: a plurality of frame compression dependencies associated with a compression scheme applied to the video stream; or a plurality of frame protection dependencies associated with one or more security protections applied to the video stream.

In one example embodiment of a method, identifying, based on the plurality of dependencies, the first subset of video frames to be transmitted using the first transmission method and the second subset of video frames to be transmitted using the second transmission method comprises: determining, based on the plurality of dependencies, that the first subset of video frames corresponds to a larger number of dependencies than the second subset of video frames.

In one example embodiment of a method: the first transmission method comprises transmitting the first subset of video frames over a first channel having a first quality of service level; and the second transmission method comprises transmitting the second subset of video frames over a second channel having a second quality of service level; wherein the first quality of service level is higher than the second quality of service level.

In one example embodiment of a method: the first transmission method comprises transmitting a plurality of replicated copies of the first subset of video frames; and the second transmission method comprises transmitting a single copy of the second subset of video frames.

In one example embodiment of a method: the first transmission method comprises transmitting the first subset of video frames to one or more distributed computing devices to be cached, wherein the one or more distributed computing devices are to transmit the first subset of video frames to the corresponding destination; and the second transmission method comprises transmitting the second subset of video frames to the corresponding destination.

In one example embodiment of a method, the method further comprises: recognizing video content in the plurality of video frames based on a video content classifier; identifying one or more video frames comprising sensitive content, wherein the one or more video frames are identified from the plurality of video frames based on the video content recognized by the video content classifier; and applying one or more security protections to the one or more video frames.

One or more embodiments may include a system, comprising: a camera to capture a video stream, wherein the video stream comprises a plurality of video frames; a network interface to communicate over a network; and processing circuitry to: access the video stream captured by the camera; identify a plurality of dependencies among the plurality of video frames; identify, based on the plurality of dependencies, a first subset of video frames to be transmitted using a first transmission method and a second subset of video frames to be transmitted using a second transmission method, wherein the first subset of video frames and the second subset of video frames are identified from the plurality of video frames, and wherein the first transmission method provides a higher quality of service than the second transmission method; transmit, via the network interface, the first subset of video frames to a corresponding destination using the first transmission method; and transmit, via the network interface, the second subset of video frames to the corresponding destination using the second transmission method.

In one example embodiment of a system: the first transmission method comprises transmitting the first subset of video frames over a first channel having a first quality of service level; and the second transmission method comprises transmitting the second subset of video frames over a second channel having a second quality of service level; wherein the first quality of service level is higher than the second quality of service level.

In one example embodiment of a system, the processing circuitry is further to: recognize video content in the plurality of video frames based on a video content classifier; identify one or more video frames comprising sensitive content, wherein the one or more video frames are identified from the plurality of video frames based on the video content recognized by the video content classifier; and apply one or more security protections to the one or more video frames.

What is claimed is:

1. An apparatus, comprising:
   a network interface to communicate over a network; and
   processing circuitry to:
      receive, via the network interface, a video stream comprising a plurality of video frames;
      identify a plurality of inter-frame dependencies among the plurality of video frames, wherein the plurality of inter-frame dependencies comprises a plurality of frame protection dependencies associated with one or more security protections applied to the video stream;
      partition the plurality of video frames into a first subset of video frames and a second subset of video frames based on the plurality of inter-frame dependencies, wherein the first subset of video frames is to be transmitted using a first transmission method and the second subset of video frames is to be transmitted using a second transmission method, wherein the first transmission method provides a higher quality of service than the second transmission method;
      transmit, via the network interface, the first subset of video frames to a corresponding destination using the first transmission method; and
      transmit, via the network interface, the second subset of video frames to the corresponding destination using the second transmission method.

2. The apparatus of claim 1, wherein the plurality of inter-frame dependencies further comprises:
   a plurality of frame compression dependencies associated with a compression scheme applied to the video stream.

3. The apparatus of claim 1, wherein the processing circuitry to partition the plurality of video frames into a first subset of video frames and a second subset of video frames based on the plurality of inter-frame dependencies is further to:
   determine, based on the plurality of inter-frame dependencies, that the first subset of video frames corresponds to a larger number of dependencies than the second subset of video frames.

4. The apparatus of claim 1, wherein:
the first transmission method comprises transmitting the first subset of video frames over a first channel having a first quality of service level; and
the second transmission method comprises transmitting the second subset of video frames over a second channel having a second quality of service level;
wherein the first quality of service level is higher than the second quality of service level.

5. The apparatus of claim 1, wherein:
the first transmission method comprises transmitting a plurality of replicated copies of the first subset of video frames; and
the second transmission method comprises transmitting a single copy of the second subset of video frames.

6. The apparatus of claim 1, wherein:
the first transmission method comprises transmitting the first subset of video frames to one or more distributed computing devices to be cached, wherein the one or more distributed computing devices are to transmit the first subset of video frames to the corresponding destination; and
the second transmission method comprises transmitting the second subset of video frames to the corresponding destination.

7. The apparatus of claim 6, wherein the one or more distributed computing devices are associated with:
a blockchain network; or
a distributed hash table.

8. The apparatus of claim 1, wherein the processing circuitry is further to:
recognize video content in the plurality of video frames based on a video content classifier;
identify one or more video frames comprising sensitive content, wherein the one or more video frames are identified from the plurality of video frames based on the video content recognized by the video content classifier; and
apply one or more security protections to the one or more video frames.

9. At least one non-transitory machine accessible storage medium having instructions stored thereon, wherein the instructions, when executed on a machine, cause the machine to:
receive, via a network interface, a video stream comprising a plurality of video frames;
identify a plurality of inter-frame dependencies among the plurality of video frames, wherein the plurality of inter-frame dependencies comprises a plurality of frame protection dependencies associated with one or more security protections applied to the video stream;
partition the plurality of video frames into a first subset of video frames and a second subset of video frames based on the plurality of inter-frame dependencies, wherein the first subset of video frames is to be transmitted using a first transmission method and the second subset of video frames is to be transmitted using a second transmission method, wherein the first transmission method provides a higher quality of service than the second transmission method;
transmit, via the network interface, the first subset of video frames to a corresponding destination using the first transmission method; and
transmit, via the network interface, the second subset of video frames to the corresponding destination using the second transmission method.

10. The storage medium of claim 9, wherein the plurality of inter-frame dependencies further comprises:
a plurality of frame compression dependencies associated with a compression scheme applied to the video stream.

11. The storage medium of claim 9, wherein the instructions that cause the machine to partition the plurality of video frames into a first subset of video frames and a second subset of video frames based on the plurality of inter-frame dependencies further cause the machine to:
determine, based on the plurality of inter-frame dependencies, that the first subset of video frames corresponds to a larger number of dependencies than the second subset of video frames.

12. The storage medium of claim 9, wherein:
the first transmission method comprises transmitting the first subset of video frames over a first channel having a first quality of service level; and
the second transmission method comprises transmitting the second subset of video frames over a second channel having a second quality of service level;
wherein the first quality of service level is higher than the second quality of service level.

13. The storage medium of claim 9, wherein:
the first transmission method comprises transmitting a plurality of replicated copies of the first subset of video frames; and
the second transmission method comprises transmitting a single copy of the second subset of video frames.

14. The storage medium of claim 9, wherein:
the first transmission method comprises transmitting the first subset of video frames to one or more distributed computing devices to be cached, wherein the one or more distributed computing devices are to transmit the first subset of video frames to the corresponding destination; and
the second transmission method comprises transmitting the second subset of video frames to the corresponding destination.

15. The storage medium of claim 9, wherein the instructions further cause the machine to:
recognize video content in the plurality of video frames based on a video content classifier;
identify one or more video frames comprising sensitive content, wherein the one or more video frames are identified from the plurality of video frames based on the video content recognized by the video content classifier; and
apply one or more security protections to the one or more video frames.

16. A method, comprising:
receiving, via a network interface, a video stream comprising a plurality of video frames;
identifying a plurality of inter-frame dependencies among the plurality of video frames, wherein the plurality of inter-frame dependencies comprises a plurality of frame protection dependencies associated with one or more security protections applied to the video stream;
partitioning the plurality of video frames into a first subset of video frames and a second subset of video frames based on the plurality of inter-frame dependencies, wherein the first subset of video frames is to be transmitted using a first transmission method and the second subset of video frames is to be transmitted using a second transmission method, wherein the first transmission method provides a higher quality of service than the second transmission method;

transmitting, via the network interface, the first subset of video frames to a corresponding destination using the first transmission method; and transmitting, via the network interface, the second subset of video frames to the corresponding destination using the second transmission method.

17. The method of claim 16, wherein the plurality of inter-frame dependencies further comprises:
a plurality of frame compression dependencies associated with a compression scheme applied to the video stream.

18. The method of claim 16, wherein partitioning the plurality of video frames into a first subset of video frames and a second subset of video frames based on the plurality of inter-frame dependencies comprises:
determining, based on the plurality of inter-frame dependencies, that the first subset of video frames corresponds to a larger number of dependencies than the second subset of video frames.

19. The method of claim 16, wherein:
the first transmission method comprises transmitting the first subset of video frames over a first channel having a first quality of service level; and
the second transmission method comprises transmitting the second subset of video frames over a second channel having a second quality of service level;
wherein the first quality of service level is higher than the second quality of service level.

20. The method of claim 16, wherein:
the first transmission method comprises transmitting a plurality of replicated copies of the first subset of video frames; and
the second transmission method comprises transmitting a single copy of the second subset of video frames.

21. The method of claim 16, wherein:
the first transmission method comprises transmitting the first subset of video frames to one or more distributed computing devices to be cached, wherein the one or more distributed computing devices are to transmit the first subset of video frames to the corresponding destination; and
the second transmission method comprises transmitting the second subset of video frames to the corresponding destination.

22. The method of claim 16, further comprising:
recognizing video content in the plurality of video frames based on a video content classifier;
identifying one or more video frames comprising sensitive content, wherein the one or more video frames are identified from the plurality of video frames based on the video content recognized by the video content classifier; and
applying one or more security protections to the one or more video frames.

23. A system, comprising:
a camera to capture a video stream, wherein the video stream comprises a plurality of video frames;
a network interface to communicate over a network; and
processing circuitry to:
access the video stream captured by the camera;
identify a plurality of inter-frame dependencies among the plurality of video frames, wherein the plurality of inter-frame dependencies comprises a plurality of frame protection dependencies associated with one or more security protections applied to the video stream;
partition the plurality of video frames into a first subset of video frames and a second subset of video frames based on the plurality of inter-frame dependencies, wherein the first subset of video frames is to be transmitted using a first transmission method and the second subset of video frames is to be transmitted using a second transmission method, wherein the first transmission method provides a higher quality of service than the second transmission method;
transmit, via the network interface, the first subset of video frames to a corresponding destination using the first transmission method; and
transmit, via the network interface, the second subset of video frames to the corresponding destination using the second transmission method.

24. The system of claim 23, wherein:
the first transmission method comprises transmitting the first subset of video frames over a first channel having a first quality of service level; and
the second transmission method comprises transmitting the second subset of video frames over a second channel having a second quality of service level;
wherein the first quality of service level is higher than the second quality of service level.

25. The system of claim 23, wherein the processing circuitry is further to:
recognize video content in the plurality of video frames based on a video content classifier;
identify one or more video frames comprising sensitive content, wherein the one or more video frames are identified from the plurality of video frames based on the video content recognized by the video content classifier; and
apply one or more security protections to the one or more video frames.

* * * * *